(12) United States Patent
Li et al.

(10) Patent No.: US 9,652,654 B2
(45) Date of Patent: May 16, 2017

(54) SYSTEM AND METHOD FOR PROVIDING AN INTERACTIVE SHOPPING EXPERIENCE VIA WEBCAM

(75) Inventors: Bin Li, Shanghai (CN); Xiaohan Yun, Shanghai (CN); Zehong Tan, Shanghai (CN)

(73) Assignee: EBAY INC., San Jose, CA (US)

( * ) Notice: Subject to any disclaimer, the term of this patent is extended or adjusted under 35 U.S.C. 154(b) by 150 days.

(21) Appl. No.: 13/488,020

(22) Filed: Jun. 4, 2012

(65) Prior Publication Data

US 2013/0322685 A1 Dec. 5, 2013

(51) Int. Cl.
*G06K 9/00* (2006.01)
*G06T 11/00* (2006.01)
*G06Q 30/02* (2012.01)
*G06Q 30/06* (2012.01)
*G06Q 50/00* (2012.01)

(52) U.S. Cl.
CPC .......... *G06K 9/00* (2013.01); *G06Q 30/0241* (2013.01); *G06Q 30/0601* (2013.01); *G06T 11/00* (2013.01); *G06K 9/00248* (2013.01); *G06Q 50/01* (2013.01)

(58) Field of Classification Search
CPC ................ G06F 3/017; G06F 3/011; G06F 2203/04808; G06T 19/006
See application file for complete search history.

(56) References Cited

U.S. PATENT DOCUMENTS

| | | |
|---|---|---|
| 4,539,585 A | 9/1985 | Spackova et al. |
| 5,680,528 A | 10/1997 | Korszun |
| 5,724,522 A | 3/1998 | Kagami et al. |
| 5,850,222 A | 12/1998 | Cone |
| 5,930,769 A | 7/1999 | Rose |
| 5,950,173 A | 9/1999 | Perkowski |
| 6,307,568 B1 | 10/2001 | Rom |
| 6,310,627 B1 | 10/2001 | Sakaguchi |
| 6,546,309 B1 | 4/2003 | Gazzuolo |
| 6,665,577 B2 | 12/2003 | Onyshkevych |
| 6,701,207 B1 | 3/2004 | Gazzuolo |

(Continued)

FOREIGN PATENT DOCUMENTS

| | | |
|---|---|---|
| WO | WO-2012117360 A1 | 9/2012 |
| WO | WO-2014182889 A1 | 11/2014 |

OTHER PUBLICATIONS

Song, Shiwei, Eric Ruth, and Ankit Gupta. "Virtual Glasses for Real People." (2009).*

(Continued)

*Primary Examiner* — Chan Park
*Assistant Examiner* — Raphael Schwartz

(57) ABSTRACT

A system and method for providing an interactive shopping experience via webcam is disclosed. A particular embodiment includes enabling a user to select from a plurality of items of virtual apparel; obtaining an image of a user via a web-enabled camera (webcam); using a data processor to perform facial detection on the image to isolate an image of a face of the user; estimating the user's position according to a position and a size of the image of the user's face; modifying an image corresponding to the selected item of virtual apparel based on the size of the image of the user's face; and auto-fitting the modified image corresponding to the selected item of virtual apparel to the image of the user's face.

17 Claims, 16 Drawing Sheets

(56) References Cited

U.S. PATENT DOCUMENTS

| | | | |
|---|---|---|---|
| 6,882,897 | B1 | 4/2005 | Fernandez |
| 6,901,379 | B1 | 5/2005 | Balter et al. |
| 6,903,756 | B1 | 6/2005 | Giannini |
| 6,965,873 | B1 | 11/2005 | Rhoads |
| 7,013,290 | B2 | 3/2006 | Ananian |
| 7,039,486 | B2 | 5/2006 | Wang |
| 7,062,454 | B1 | 6/2006 | Giannini et al. |
| 7,113,918 | B1 | 9/2006 | Ahmad et al. |
| 7,133,839 | B2 | 11/2006 | Inoue et al. |
| 7,149,665 | B2 | 12/2006 | Feld et al. |
| 7,418,407 | B2 | 8/2008 | Giannini et al. |
| 7,433,753 | B2 | 10/2008 | Okada et al. |
| 7,548,794 | B2 | 6/2009 | Vandergriff et al. |
| 7,712,035 | B2 | 5/2010 | Giannini |
| 7,714,912 | B2 | 5/2010 | Faisman et al. |
| 7,905,028 | B2 | 3/2011 | Sieber |
| 8,078,498 | B2 | 12/2011 | Edmark |
| 8,078,499 | B1 | 12/2011 | Gianinni et al. |
| 2002/0004753 | A1 | 1/2002 | Perkowski |
| 2002/0024517 | A1 | 2/2002 | Yamaguchi et al. |
| 2002/0158916 | A1 | 10/2002 | Gusler et al. |
| 2002/0169687 | A1 | 11/2002 | Perkowski |
| 2003/0101105 | A1 | 5/2003 | Vock |
| 2003/0110099 | A1 | 6/2003 | Trajkovic et al. |
| 2004/0004633 | A1 | 1/2004 | Perry et al. |
| 2005/0131776 | A1 | 6/2005 | Perotti et al. |
| 2005/0162419 | A1* | 7/2005 | Kim et al. ................ 345/419 |
| 2005/0234782 | A1 | 10/2005 | Schackne et al. |
| 2006/0080182 | A1 | 4/2006 | Thompson et al. |
| 2006/0271448 | A1 | 11/2006 | Inoue et al. |
| 2007/0220540 | A1 | 9/2007 | Walker et al. |
| 2007/0276721 | A1 | 11/2007 | Jackson |
| 2008/0163344 | A1 | 7/2008 | Yang |
| 2008/0255920 | A1 | 10/2008 | Vandergriff et al. |
| 2009/0115777 | A1 | 5/2009 | Reyers Moreno |
| 2009/0271705 | A1 | 10/2009 | Sheng et al. |
| 2009/0319388 | A1 | 12/2009 | Yuan et al. |
| 2010/0030578 | A1 | 2/2010 | Siddique et al. |
| 2010/0306716 | A1* | 12/2010 | Perez ........................... 715/863 |
| 2011/0050549 | A1 | 3/2011 | Yamada et al. |
| 2011/0106662 | A1 | 5/2011 | Stinchcomb |
| 2011/0187743 | A1 | 8/2011 | Hwang et al. |
| 2011/0218846 | A1 | 9/2011 | Fieldman et al. |
| 2012/0158539 | A1 | 6/2012 | Lawrence et al. |
| 2012/0293513 | A1* | 11/2012 | Krishnaswamy ............. 345/423 |
| 2012/0293544 | A1* | 11/2012 | Miyamoto et al. ........... 345/620 |
| 2014/0095289 | A1 | 4/2014 | Mobberley |
| 2014/0337176 | A1 | 11/2014 | Ruvini |

OTHER PUBLICATIONS

Déniz, Oscar, et al. "Computer vision based eyewear selector." Journal of Zhejiang University Science C 11.2 (2010): 79-91.*

Micilotta, Antonio S., Eng-Jon Ong, and Richard Bowden. "Detection and Tracking of Humans by Probabilistic Body Part Assembly." BMVC. 2005.*

Viola, Paul, and Michael J. Jones. "Robust real-time face detection." International journal of computer vision 57.2 (2004): 137-154.*

U.S. Appl. No. 13/890,048, filed May 8, 2013, Performing Image Searches in a Network-Based Publication System.

"Augmented Reality Software Development Company, Zugara, Granted Patent on "Virtual Dressing Room" Platform", [Online]. Retrieved from the Internet: <URL: http://thirdwavefashion.com/2012/10/augmented-reality-software-development-company-zugara-granted-patent-on-virtual-dressing-room-platform/>, (Oct. 1, 2012) , 3 pgs.

"Augmented-Reality "Virtual Dressing Room" Patent Issued", [Online]. Retrieved from the Internet: <URL: http://www.kurzweilai.net/augmented-reality-virtual-dressing-room-patent-issued>, (Sep. 26, 2012), 1 pg.

"Estonian Start-Up Creates Vitual Fitting Room", PRI's The World, [Online]. Retrieved from the Internet: <URL: http://www.theworld.org/2010/06/estonian-start-up-creates-virtual-fitting-room/>, (Jun. 28, 2010), 4 pgs.

"Fits.me—Virtual Fitting Room", [Online]. Retrieved from the Internet: <URL: http://fits.me/solutions/the-fits-me-virtual-fitting-room/>, (Accessed Aug. 5, 2013), 3 pgs.

"Fitting Reality Unveils VIPodium, the Next Generation Virtual Fitting Room, at DEMO Fall 2011", Marketwire Inc., [Online]. Retrieved from the Internet: <URL: http://www.marketwire.com/press-release/fitting-reality-unveils-vipodium-next-generation-virtual-fitting-room-demo-fall-2011-1560018.htm>, (Sep. 13, 2011), 2 pgs.

"Fitting Reality Unveils VIPodium, the Next Generation Vitual Fitting Room, at DEMO Fall 2011", Reuters, [Online]. Retrieved from the Internet: <URL: http://www.reuters.com/article/2011/09/13/idUS43994+13-Sep-2011+MW20110913>, (Sep. 13, 2011), 4 pgs.

"Webcam Social Shopper—Wikipedia", [Online]. Retrieved from the Internet: <URL: http://en.wikipedia.org/wiki/Webcam_Social_Shopper>, (accessed Aug. 2, 2013), 3 pgs.

Bosker, Bianca, "Tobi.com Fashionista: Online Shoppers Get virtual Fitting Room (Video)", [Online]. Retrieved from the Internet: <URL: http://www.huffingtonpost.com/2009/11/16/tobicom-fashionista-virtu_n_359674.html>, (Mar. 18, 2010), 2 pgs.

Britten, Fleur, "Brands Embrace an 'Augmented Reality'", The New York Times, [Online]. Retrieved from the Internet: <URL: http://www.nytimes.com/2011/09/21/fashion/fashion-embraces-augmented-reality-technology.html?_r=3&>, (Sep. 20, 2011), 3 pgs.

Dowbiggin, Robyn, "Virtual Fitting Rooms", Prezi Inc., [Online]. Retrieved from the Internet: <URL: http://prezi.com/gx0rrw5mulop/virtual-fitting-rooms/>, (Dec. 2, 2012), 2 pgs.

Gayomali, Chris, "Augmented Reality Lets You Try on Clothes from Online Shops", Time Inc., [Online]. Retrieved from the Internet: <URL: http://techland.time.com/2011/08/05/augmented-reality-lets-you-try-on-clothes-from-online-shops/>, (Aug. 5, 2011), 3 pgs.

Gross, Doug, "Macy's 'magic mirror' lets shoppers don virtual clothes", [Online]. Retrieved from the Internet: <URL: http://edition.cnn.com/2010/TECH/innovation/10/14/macys.virtual.mirror/index.html>, (Oct. 14, 2010), 2 pgs.

Heyman, Marshall, "The Barbie Closet: A Tweenage Dream", The Wall Street Journal, [Online]. Retrieved from the Internet: <URL: http://online.wsj.com/article/SB10001424052970204883304577219351219379714.html>, (Feb. 13, 2012), 4 pgs.

Kincaid, Jason, "Zugara's Augmented Reality Dressing Room Is Great If You Don't Care How Yoru Clothes Fit", [Online]. Retrieved from the Internet: <URL: http://techcrunch.com/2009/06/23/zugaras-augmented-reality-dressing-room-is-great-if-you-dont-care-how-your-clothes-fit/>, (Jun. 23, 2009), 4 pgs.

Kuang, Cliff, "its.Me's Shape-Shifting Robot Lets You Try on Clothes, Online [Video]", [Online]. Retrieved from the Internet: <URL: http://www.fastcodesign.com/1662372/fitsmes-shape-shifting-robot-lets-you-try-on-clothes-online-video>, (Sep. 27, 2010), 5 pgs.

Moore, Stefany, "Try Me On", Internet Retailer, [Online]. Retrieved from the Internet: <URL: http://www.internetretailer.com/2012/02/01/try-me?p=1>, (Feb. 1, 2012), 7 pgs.

Moses, Asher, "Another Blow to Retailers: Virtual Dressing Rooms", The Sydney Morning Herald, [Online]. Retrieved from the Internet: <URL: http://www.smh.com.au/technology/technology-news/another-blow-to-retailers-virtual-dressing-rooms-20110809-1ijxa.html>, (Aug. 9, 2011), 5 pgs.

Perez, Sarah, "Retailer Lets Online Shoppers Virtually Try on Clothes Using Augmented Reality", [Online]. Retrieved from the Internet: <URL: http://readwrite.com/2011/08/04/retailer_lets_online_shoppers_virtually_try_on_clothes_using_augmented_reality#awesm=~odLW0uEnxNTTaU>, (Aug. 4, 2011), 3 pgs.

Sinsky, Regina, "Demo: Fitting Reality tries a new virtual dressing room on for size", [Online]. Retrieved from the Internet: <URL: http://venturebeat.com/2011/09/13/demo-fitting-reality-virtual-dressing-room/>, (Sep. 13, 2011), 3 pgs.

(56) References Cited

OTHER PUBLICATIONS

Takahashi, Dean, "DEMO: Zugara engages online shoppers with dress-up visualization", [Online]. Retrieved from the Internet: <URL: http://venturebeat.com/2011/02/28/demo-zugara-engages-online-shoppers-with-dress-up-visualization/>, (Feb. 28, 2011), 3 pgs.

"International Application Serial No. PCT/US2014/037283, International Search Report mailed Sep. 30, 2014", 2 pgs.

"International Application Serial No. PCT/US2014/037283, Written Opinion mailed Sep. 30, 2014", 5 pgs.

"U.S. Appl. No. 13/890,048, Final Office Action mailed Jul. 26, 2016", 21 pgs.

"U.S. Appl. No. 13/890,048, Non Final Office Action mailed Feb. 3, 2016", 18 pgs.

"U.S. Appl. No. 13/890,048, Response filed Jun. 3, 2016 to Non Final Office Action mailed Feb. 3, 2016", 17 pgs.

"Application Serial No. PCT/US2014/037283, International Preliminary Report on Patentability mailed Nov. 19, 2015", 7 pgs.

"U.S. Appl. No. 13/890,048, Response filed Oct. 26, 2016 to Final Office Action mailed Jul. 26, 2016", 17 pgs.

\* cited by examiner

SYSTEM AND METHOD FOR PROVIDING AN INTERACTIVE SHOPPING EXPERIENCE VIA WEBCAM

TECHNICAL FIELD

This application relates to a method and system for use with an electronic commerce system, according to one embodiment, and more specifically, for providing an interactive shopping experience via webcam.

BACKGROUND

On-line commerce sites on a wide-area public network (e.g., the Internet) often publish information regarding products or services for sale to shoppers/purchasers who seek to purchase the offered products or services. However, it can be difficult for on-line shoppers to shop for items, such as apparel and shoes, which cannot be tried on or fitted in a conventional on-line store. As a result, a significant number of sales of these items are lost to e-commerce vendors.

BRIEF DESCRIPTION OF THE DRAWINGS

The various embodiments is illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In one embodiment, a system and method for providing an interactive shopping experience via webcam is disclosed. In various example embodiments, an interactive shopping network aims to simplify, facilitate, and improve the efficiency of an interactive shopping experience using a webcam (e.g., a web-enabled video camera). A particular embodiment can enable users to try on clothes or other apparel virtually via a webcam. This virtual shopping technique can improve an online shopping experience for a user using an e-commerce platform, such as eBay. The webcam can be the tool to bridge the presence of virtual items online and the reality of the actual location of the user/shopper. Using the various embodiments disclosed herein, when users try on clothes virtually, they can control the experience by hand in addition to using the traditional controllers, such as a mouse and/or computer keyboard.

In an example embodiment, the system and method disclosed herein enable this improved virtual shopping experience by providing a means to detect skin area and track the movement of hands. Skin area detection is realized by analyzing color information of the user's image taken by the webcam. Instead of standard RGB (red, green, blue) color coding, an example embodiment converts each pixel into YCbCr color space; which is tolerant for light variance and saturation. YCbCr represents a family of color spaces used as a part of the color image pipeline in video and digital photography systems. Y is the luminance component and $C_B$ and $C_R$ are the blue-difference and red-difference chroma components. This method works well for skin color recognition in various environments and people of different races (therefore with different skin tones).

In an example embodiment, hand tracking is enabled by detecting the direction of hand movement. Different hand signal directions can signal different user intention, such as resize the clothes, re-position the clothes relative to body image, and the like. These functions are supported by the performance enhancement processes described herein, which can greatly improve a buyer experience for online shopping. The details of various embodiments are described in more detail below.

Figure 1:
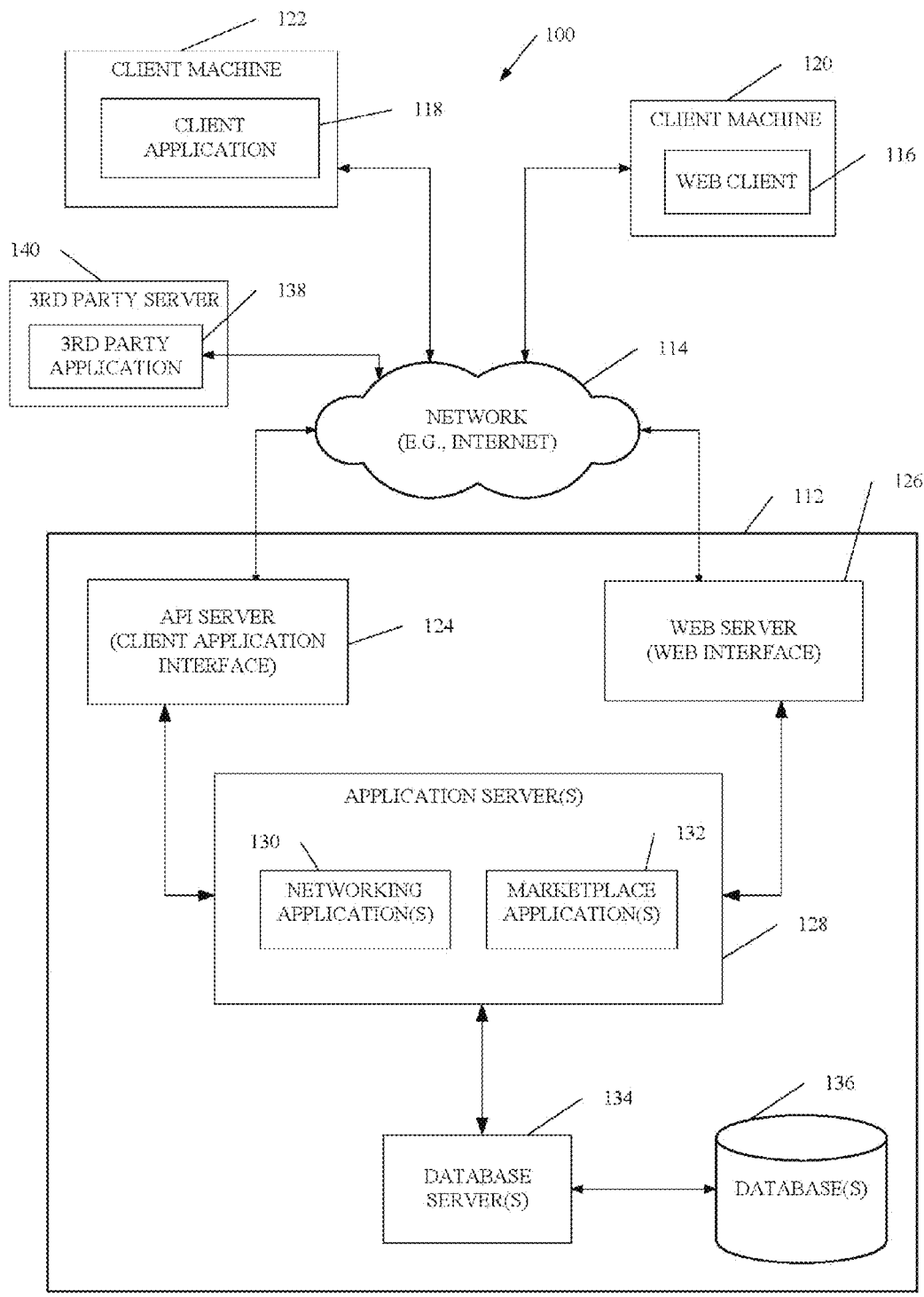
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a trading/commerce system where clients may communicate and exchange data with the trading/commerce system, the data may pertain to various functions (e.g., online purchases) and aspects (e.g., managing social networks) associated with the network system 100. Although illustrated herein as a client-server architecture for simplicity, in other embodiments the network architecture may vary and include an architecture such as a peer machine in a peer-to-peer (or distributed) network environment.

Returning to FIG. 1, a data exchange platform, in an example form of a network-based provider (or host system/site) 112, provides server-side functionality, via a network 114 (e.g., the Internet) to one or more clients. The one or more clients may include users that may utilize the network system 100 and more specifically, the network-based provider 112, to exchange data over the network 114. These transactions may include transmitting, receiving (communicating) and processing data to and from the multitude of users. The data may include, but is not limited to, user data including, user image data, user gesture data, user preference information, user profile information, ad search queries, search keywords, shopping or listing context information and/or identifiers, context data, notations (e.g., personal and public shopping notes), context filter data, shared electronic shopping carts, product and service reviews, product, service, manufacture, and vendor recommendations and identifiers, product and service listings associated with buyers and sellers, auction bids, feedback, etc. In one embodiment, the user information can be associated with one or more contexts generated by a user or other users and maintained on the network-based provider 112. Data associated with a user, such as any of the data described above, may be publicly shared as determined by the originator of the data.

Turning specifically to the network-based marketplace or Webcam-enabled Interactive Shopping System 112, an application program interface (API) server 124 and a web server 126 are coupled to, and provide programmatic and web interfaces respectively to, one or more application servers 128. The application servers 128 host one or more networking application(s) 130 and marketplace application(s) 132. The application servers 128 are, in turn, shown to be coupled to one or more databases servers 134 that facilitate access to one or more databases 136.

In one embodiment, the web server 126 may send and receive data pertaining to a user or item listing via a toolbar installed on a browser application. The toolbar may allow for a user or a third party to, inter alia, create a new user profile (a profile creator), selectively add a uniform resource locator (URL) associated with the created user profile, and create notations regarding research and general matters associated with the user profile. In other embodiments, the web server may serve a page or the API server 124 in conjunction with the client application 118 may provide the same or similar functionality as that described with reference to the toolbar. It may be noted that using a toolbar within an application such as a browser or stand-alone application is well known in the art.

The marketplace application(s) 132 may provide a number of marketplace functions and services (e.g., item listings, searching, advertisement, payment, etc.) to users that access the network-based marketplace 112. The networking application(s) 130 likewise may provide a number of consumer services, merchant services, or social networking services and functions to users. The networking application(s) 130 may allow a user to generate one or more contexts related to shopping or advertisement (ad) generation, which may include listings (e.g., for products and services) couched as a broad category associated with a consumer, a class of consumers, and/or an item (e.g., a product or service or a listing for a product or service) or class of items. Additionally, listings can be couched as associated with a specific consumer or a specific item. For example, listings in the form of a category could be, "jackets" or "shoes." Similarly, a context can include a user profile associated with a category of users or a specific user. For example, a user profile in the form of a category could be, "women over 40 years old" or "purchasers of sports apparel." An example of a user profile in a more specific form may be, "a user profile for John A. Smith of Akron, Ohio" or "purchasers of Nike running shoes." The level of specificity may vary and is selectable by the user profile creator or administrator of the interactive shopping engine of a particular embodiment. For example, the user profile can be as specific as a particular person or the associated listing associated with a make, model, additional specific attributes or features of a specific item or service offered for sale or lease.

In one embodiment, the networking application(s) 130 and marketplace application(s) 132 may provide a client (e.g., web client 116) with an interface that includes input fields for personality or item/listing attributes most commonly selected by other users as the most important or most determinative attributes related to the products/services which a user/consumer is seeking or selling. For example, a multitude of users may have indicated they thought the most important personality attributes for the user profile include information related to: 1) consumer/user need, 2) general consumer/user personality, 3) consumer/user shopping attitude, and 4) consumer/user budget. A multitude of other users may have indicated they thought the most important item attributes for a sports apparel purchaser user profile include: 1) sports apparel brand, 2) cost, and 3) size. These user profile attributes may be independently developed or discovered by the network-based marketplace 112 by processing the attribute data received from the multitude of users or may be based on the user profile creator ranking the attributes or a combination thereof.

The networking application(s) 130 may allow the user profile creator or interactive shopping engine user to distribute the one or more user profiles to one or more groups defined by the user profile creator or interactive shopping engine user (e.g., "my family," "my friends," etc.) or to groups at various levels in a predefined category (e.g., "running group," "sports apparel group," or "Nike running shoe group," etc.).

While the networking application(s) 130 and the marketplace application(s) 132 are shown in FIG. 1 to form part of the network-based marketplace 112, it will be appreciated that, in alternative embodiments, the networking application(s) 130 may form part of a social networking service that is separate and distinct from the network-based marketplace 112.

FIG. 1 also illustrates a third party application 138, executing on a third party server machine 140, as having programmatic access to the network-based marketplace 112 via the programmatic interface provided by the API server 124. For example, the third party application 138 may, utilizing information retrieved from the network-based marketplace 112, support one or more features or functions on a website hosted by the third party. The third party website may, for example, provide one or more networking, marketplace or payment functions that are supported by the relevant applications of the network-based marketplace 112.

Figure 2:
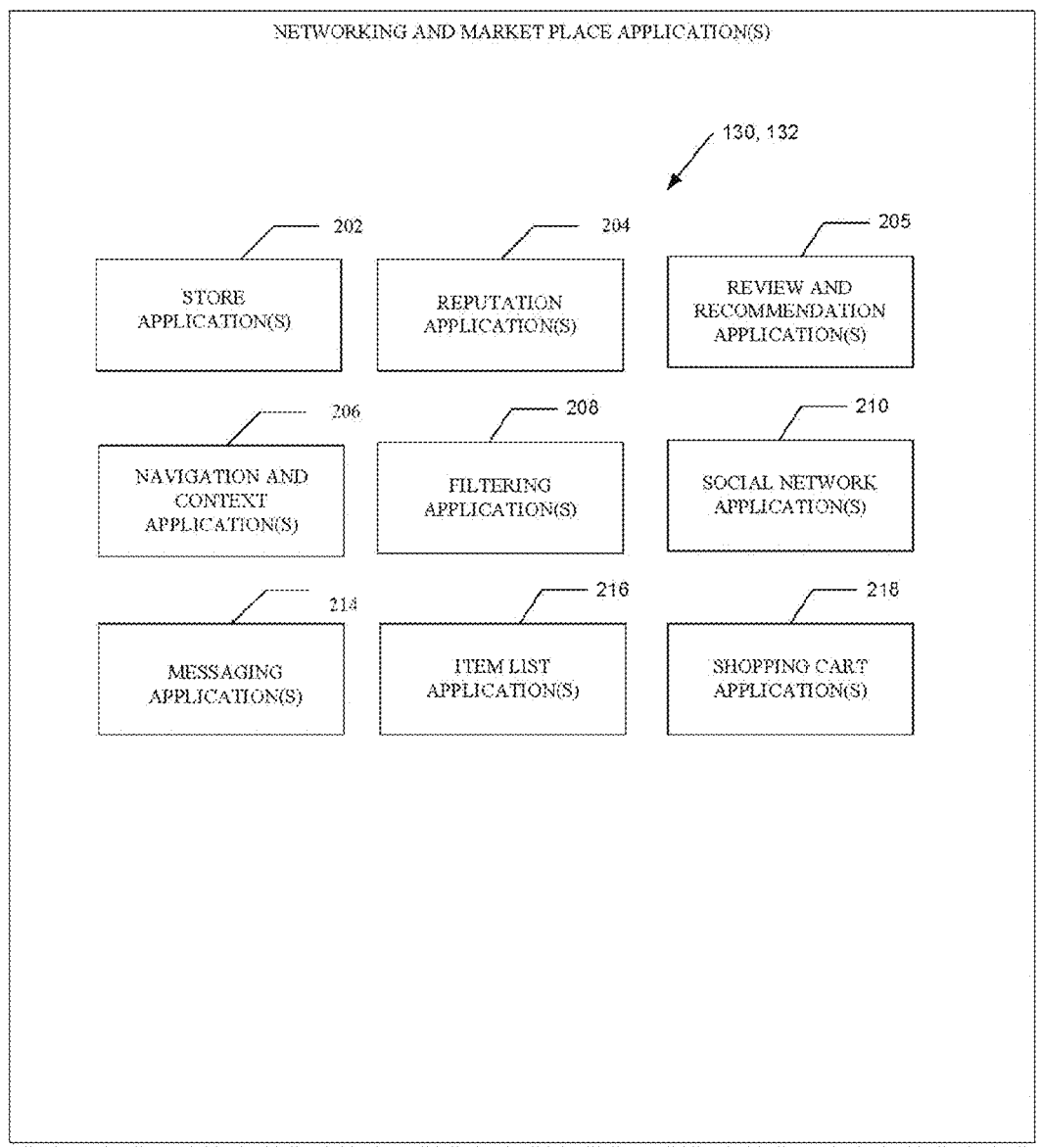
FIG. 2 is a block diagram illustrating an example embodiment of multiple network and marketplace applications, respectively, which are provided as part of a network-based marketplace.

FIG. 2 is a block diagram illustrating an example embodiment of multiple network and marketplace application(s) 130 and 132, respectively, which are provided as part of the network-based marketplace 112. The network-based marketplace 112 may provide a number of feeds or listings for goods and/or services, category-based shopping, social networking, and purchase and bidding systems, various levels of features provided for users, and price-setting mechanisms whereby a seller may list goods and/or services (e.g., for sale, bid, or lease) and a buyer may buy or bid on listed goods and/or services. A user profile and context associated with a user shopping or listing an item in the network-based marketplace 112 may offer or provide information that may be helpful in assisting the interactive shopping engine user in customizing their shopping or listing experience pertaining to the user profile or listing information (i.e., context). Among various embodiments, the recommendations, reviews, or research notes corresponding to the user profile or listing information may be directed from another user to one or more users desiring data associated with the user profile or listing information or the data may be provided from storage by the network and marketplace application(s) 130 and 132 based on the user profile or listing information provided by a user. The data may be provided based on a request from the user profile creator or automatically pushed to the user profile creator based on policy or a user configuration file.

To this end, the network and marketplace application(s) 130 and 132, respectively, are shown to include one or more application(s) which support the network-based marketplace 112, and more specifically the generation and maintenance of one or more user profiles provided by users of the network-based marketplace 112 or interactive shopping engine users. These applications can include support for activities associated with the user profiles and listing information, including storing and retrieving user notes, web sites (URLs), links associated with related tags, research and notes from other users and community members, related community groups, vendors, providing localized geographic data for user profiles (e.g., regional or country-specific consumer purchasing patterns), etc. Additionally, the various applications may support social networking functions, including building and maintaining the community groups created by a user, which may be helpful in providing various types of data (e.g., reviews, notes, local services, consumer information, etc.) pertaining to the user profiles and listing information.

Store application(s) 202 may allow sellers to group their listings (e.g., goods and/or services) within a "virtual" store, which may be branded and otherwise personalized by and for the sellers. Such a virtual store may also offer promotions, incentives and features that are specific and personalized to a relevant seller and consumer. In one embodiment, based on the user profiles provided by the user profile creator, the virtual store may be provided to the user profile creator or interactive shopping engine user where the virtual store may carry or sell an item or service related to a user's need based on the user profile.

Reputation application(s) 204 may allow parties that transact utilizing the network-based marketplace 112 to establish, build, and maintain reputations, which may be made available and published to potential trading partners. Consider that where, for example, the network-based marketplace 112 supports person-to-person trading, users may have no history or other reference information whereby the trustworthiness and/or credibility of potential trading partners may be assessed. The reputation application(s) 204 may allow a user, for example through feedback provided by other transaction partners, to establish a reputation within the network-based marketplace 112 over time. Other potential trading partners may then reference such a reputation for the purposes of assessing credibility, trustworthiness, or the like. A user creating a user profile and seeking reviews, research (e.g., notes, etc.), and recommendations associated with the profile may filter the result data from the search or context submission based on reputation data. For example, the user profile creator may only want profile data such as reviews and research notes pertaining to the user profile from other users with a greater than 3 out of 5 star reputation rating.

In one embodiment, the network-based marketplace 112 includes review and recommendation application(s) 205. The social networking application(s) 210 may work in conjunction with the review and recommendation application(s) 205 to provide a user interface to facilitate the entry of reviews of the user profile data received from other users. A review may be a text entry of the community group member's opinion, a standard review form including check boxes indicating a level satisfaction, or a combination of both, etc. Recommendations may include a specific type of demographic, item, a specific brand or service for a type of item, a specific retailer for the item, etc.

Navigation of the network-based marketplace 112 may be facilitated by one or more navigation and context application(s) 206. For example, a context application may, inter alia, enable key word searches of item listings associated with a context defined by a user profile of a particular consumer. The context can include an association between the user profile data in the user profile and item feature sets related to items in the item listings. The item listings can include listings from a group including products or services or both. The item feature set data and data defining the association between the user profile data in the user profile and item feature sets may be retrieved from the network-based marketplace 112 (e.g., databases 136) or from various other remote sources, such as other network sites, other users (e.g., experts or peers), etc. In one embodiment, a toolbar installed on a browser application may be used for functions including interactive and navigation functions to create a new user profile, selectively add a uniform resource locator (URL) associated with the created user profile, and create notations regarding research and general matters associated with the user profile. These functions may be user accessible by many methods known in the art, including a web form interface (HTML or embedded Java) or a stand-alone application interface. For example, a navigation application may include a browser that allows users via an associated user interface to browse a user's user profile, various item listings, item feature sets, contexts, catalogues, inventories, social networks, and review data structures within the network-based marketplace 112. In one embodiment, the user interface includes selectable elements in the form of tabs to separate out various categories of user profile data that when selected generate a list associated with the category. For example, a tab for "My Notes," a tab for "Everyone's Notes," a tab for "Buy," and a tab for "Sell". Various other navigation applications (e.g., an external search engine) may be provided to supplement the search and browsing applications.

In one embodiment, using filtering application(s) 208, the user or interactive shopping engine user may customize result data associated with a user profile or listing search results. The filtering application(s) 208 may generate the result data according to one or more rules provided by the network-based marketplace 112 and the user receiving the filtered result data. For example, as discussed above with reference to the reputation application(s) 204, the user may only want the user profile to match on item listings pertaining to item reviews from other users with a greater than 3 out of 5 star reputation rating. In another example, the user may only want user profile data to match on item listings pertaining to item listings with a particular feature set or attribute set. For example, the user may only want result data for Nike shoes with a size equal or greater than size 10-wide. Additionally, the filtering rules may be combinable or modifiable to broaden or narrow the scope of the result data. The filtering application(s) 208 may also be used to implement rules for granting or allowing access to the user profile data.

Messaging application(s) 214 may be used for the generation and delivery of messages to users of the network-based marketplace 112. For example, the user may like a particular review or research from another user and may wish to contact the user for additional information. In one embodiment, the messaging application(s) 214 may be used in conjunction with the social networking application(s) 210 to provide promotional and/or marketing (e.g., targeted advertisements associated with the user profile) to the user or a related user from vendors and community members that may have offerings related to the user profile.

Item list application(s) 216 may be used in the network-based marketplace 112 by the user to create an item list based on selecting one or more items and services to purchase (or sell, auction, lease, or donate), which may be at least partially based on result data associated with the user's shopping experience. The item list application(s) 216 may be accessed via a user interface that allows the user to create and use the item list. Additionally, the user may selectively share this list within a community or to all users to gain or solicit additional data such as vendor recommendations for each purchase or vendor reviews for vendors that may be present in the list.

In one embodiment, electronic shopping cart application(s) 218 are used to create a shared electronic shopping cart used by a user to add and store items from a shopping list generated by the user (e.g., by making selections from a "Buy" tab). The electronic shopping cart application(s) 218 may facilitate the transactions for each item on the list by automatically finding the items in the electronic shopping cart across at least one or all of a set of vendors, a comparison shopping site, an auction site, other user's ads, etc. In one embodiment, a multitude of transactions may appear as one transaction based on the selection of "Bulk Purchase." In various embodiments, the selection criteria for which vendor or vendors to purchase from may include, but is not limited to, criteria such as lowest cost, fastest shipping time, preferred or highest rated vendors or sellers, or any combination thereof.

It will be appreciated that one or more of the various sample networking and marketplace application(s) 130, 132 may be combined into a single application including one or more modules. Further, in some embodiments, one or more applications may be omitted and additional applications may also be included.

Figure 3:
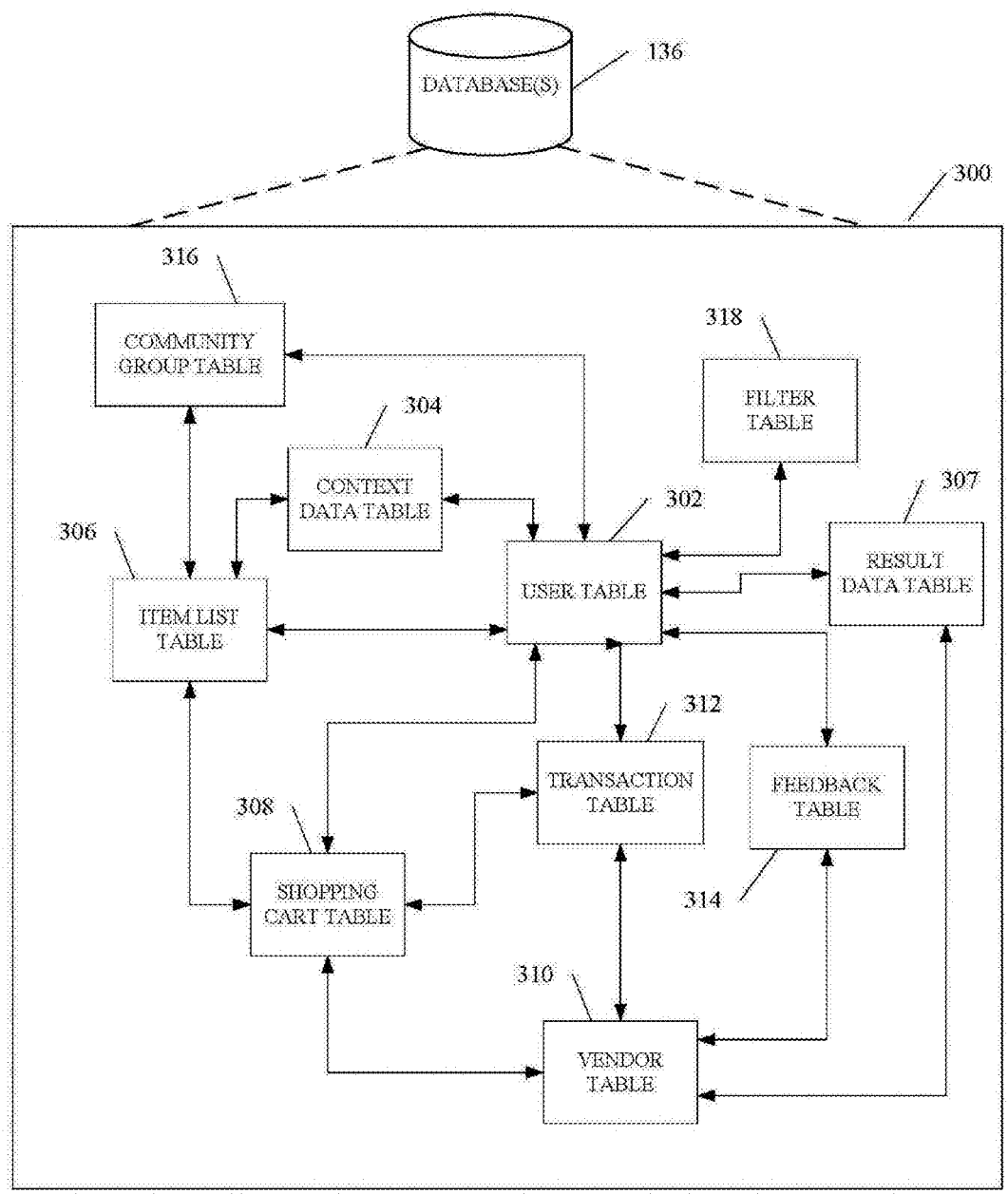
FIG. 3 is a high-level entity-relationship diagram, according to an example embodiment, illustrating various tables that may be maintained within a database to support networking and marketplace applications.

FIG. 3 is a high-level entity-relationship diagram, in accordance with an example embodiment, illustrating various tables 300 that may be maintained within the database(s) 136 (see FIG. 1), which may be utilized by and support the networking and marketplace application(s) 130 and 132, respectively. A user table 302 may contain a record for each registered user of the network-based marketplace 112, and may include identifier, address and financial instrument information pertaining to each such registered user. In one embodiment, a user operates as one or all of an interactive shopping system user, a seller, or a buyer, within the network-based marketplace 112.

The context data table 304 maintains a record of the one or more user profiles and/or listings created by or related to a user. As discussed above, this may include user profile identifiers and/or listing identifiers that may include words and/or phrases from the general to the specific for a consumer class, specific consumer, product/service class, or a specific product/service. Context data in context data table 304 can also include associations between the user profile data in the personalized consumer profiles and item feature sets related to items in the item listings. The item listings can be listings for products or services or both. The personalized consumer profiles, item feature set data, and data defining the association between the user profile data in the personalized consumer profiles and item feature set data may be stored into or retrieved from the context data table 304 of database(s) 136. In one embodiment, each word in a phrase may be a tag linked to another user profile and its associated data. For example "Nike" may be a selectable element within the user interface as a tag that results in the selector receiving more general data regarding Nike products. Similarly, "sports apparel" may be selected to receive more general data regarding sports apparel.

The tables 300 may also include an item list table 306, which maintains listing or item records for goods and/or services that were created using the item list application(s) 216. In various embodiments, the item list may be created and shared with a community group or to all users in part to solicit feedback regarding listed or potential vendors.

Each listing or item record within the item list table 306 may furthermore be linked to one or more electronic shopping cart records within a electronic shopping cart table 308 and to one or more user records within the user table 302 and/or a vendor table 310, so as to associate a seller or vendor and one or more actual or potential buyers from the community group with each item record.

A transaction table 312 may contain a record for each transaction pertaining to items or listings for which records exist within the item list table 306. For example, the transaction table 312 may contain a purchase or sales transaction of an item of the item list by a consumer.

In one example embodiment, a feedback table 314 may be utilized by one or more of the reputation application(s) 204 to construct and maintain reputation information associated with users (e.g., members of the community group, sellers, etc.).

Group(s) of users found in a community group table 316 may be selected by a user to be members of a community group having access to user profile data and an item listing associated with the electronic shopping cart.

A filter table 318 may be used to sort and filter data associated with a user profile. The sorted or filtered data are then stored in the result data table 307 and linked to the user profile creator via a user profile identifier. Various types of filters and associated rules were discussed above with reference to the filtering application(s) 208 in FIG. 2.

Figure 4:
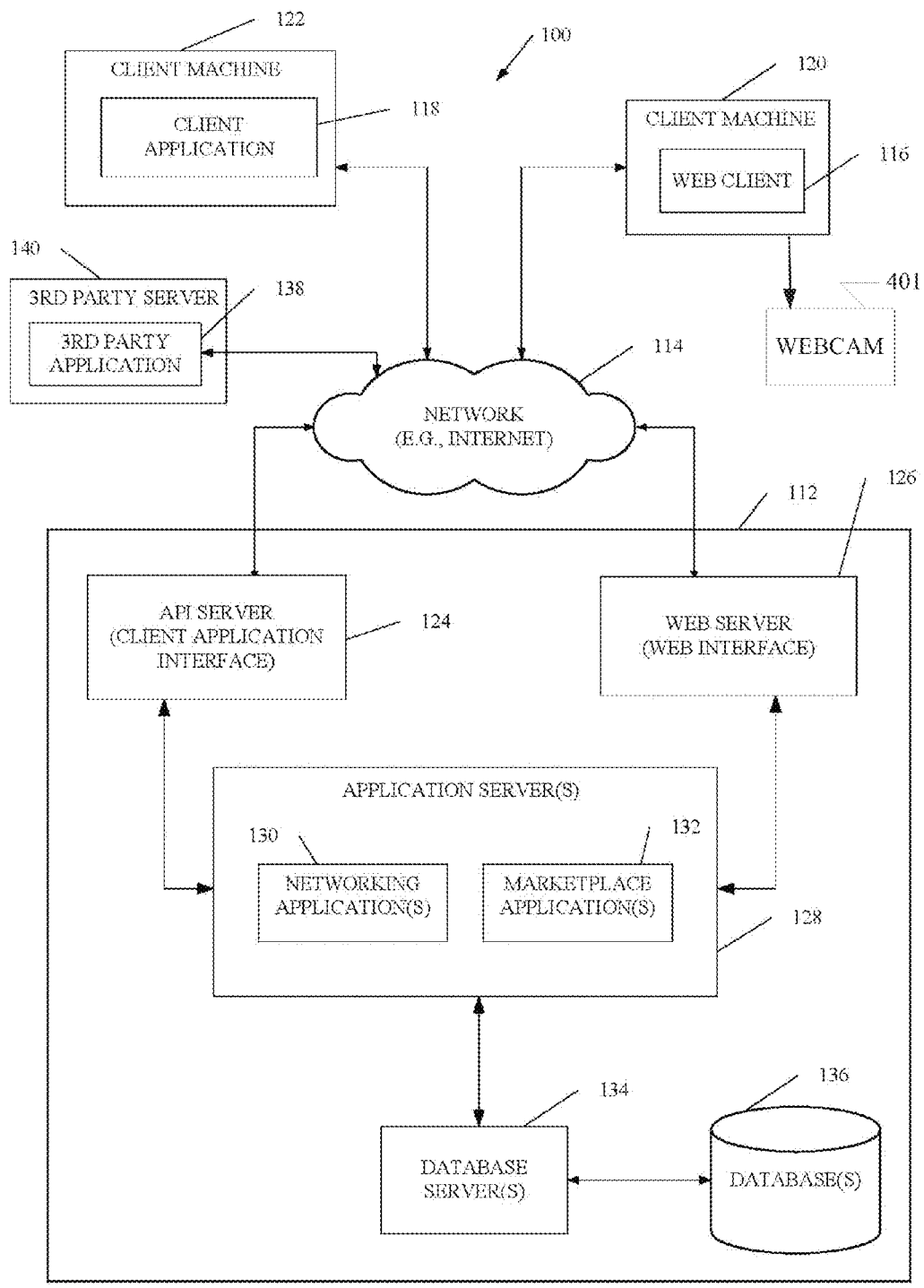
FIG. 4 is a network diagram depicting a network system, according to one embodiment, having a client-server architecture configured for exchanging data over a network, wherein one or more client systems include a web-enabled camera (webcam)

FIG. 4 is a network diagram depicting a network system 100, according to one embodiment, having a client-server architecture configured for exchanging data over a network, wherein one or more client systems include a web-enabled camera (webcam) 401. In the system configuration shown in FIG. 4, a shopper/user at client system 120 can interact with the network-based marketplace or Webcam-enabled Interactive Shopping System 112 via network 114. As a result, the shopper/user can view product listings from various websites, such as $3^{rd}$ party site 140, and purchase items via the e-commerce marketplace. The embodiments described herein allow the shopper/user to also virtually try on or be fitted with apparel, shoes, or other items not usually available for fitting via an e-commerce platform. As described in more detail below, an image of the user can be captured by the webcam 401 at the client location and used to enable the shopper/user to try on or be fitted with apparel, shoes, or other items available for purchase from the e-commerce marketplace.

Auto-Fit & Face Recognition

Figure 6:
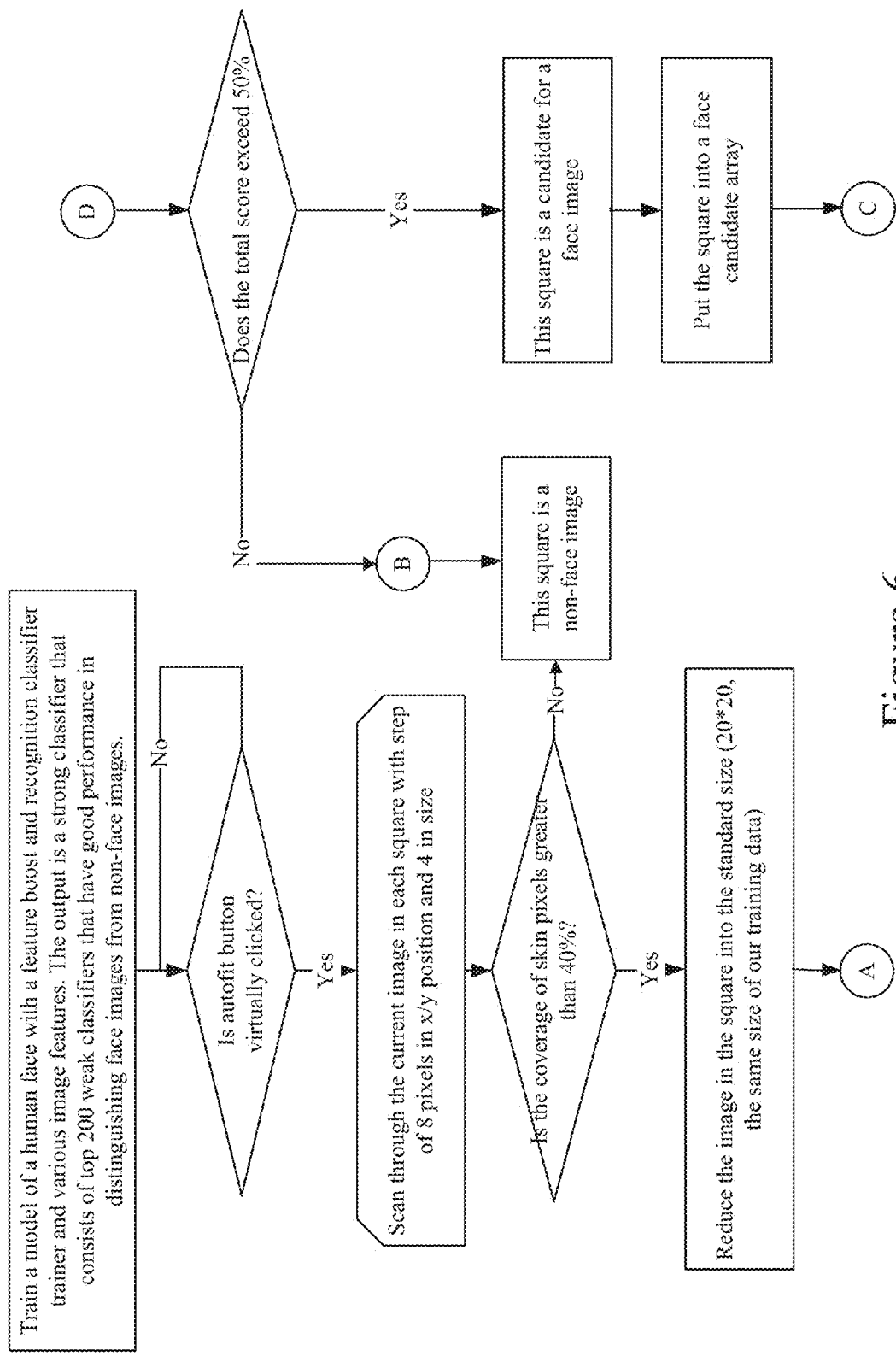
FIGS. 6 through 8 illustrate the details of the auto-fit and face recognition process of an example embodiment.
Figure 7:
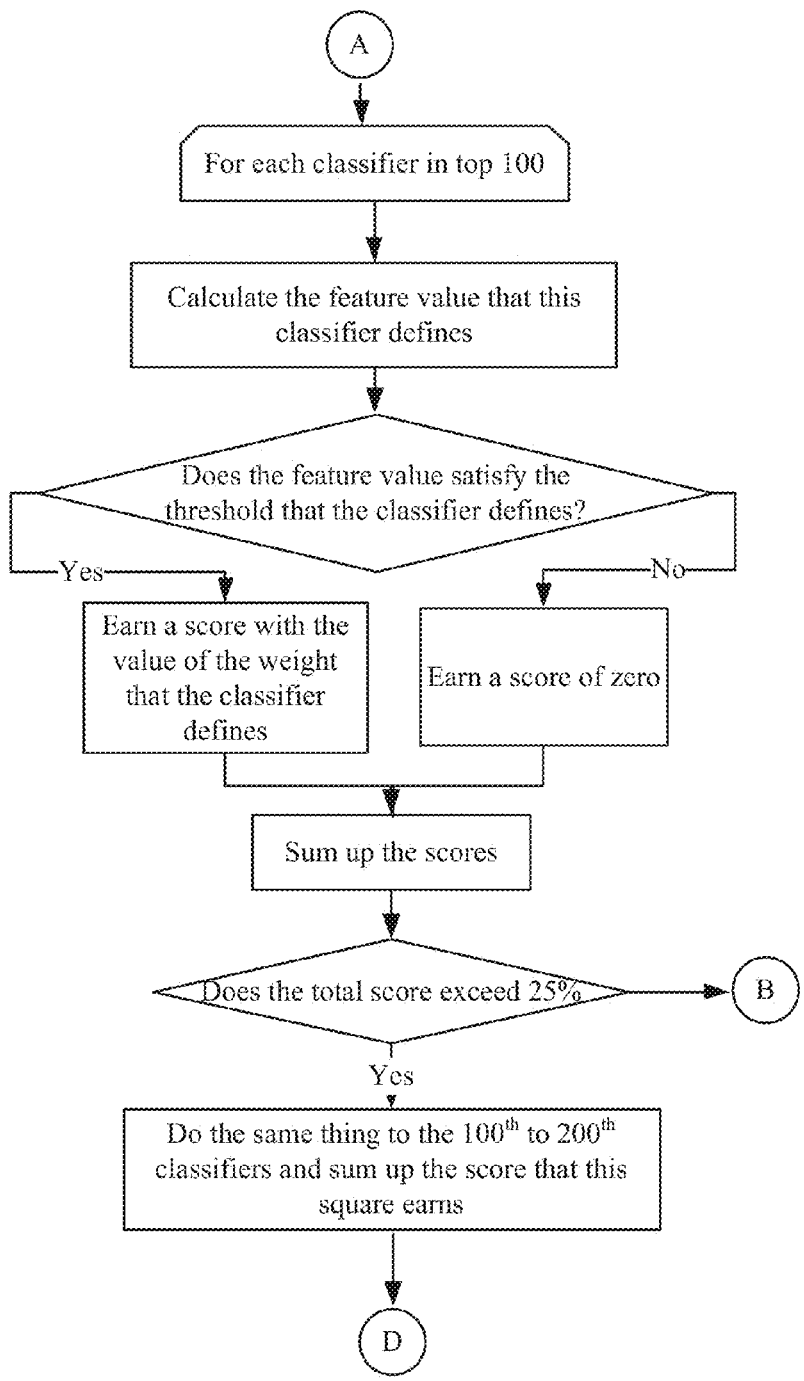
Figure 8:
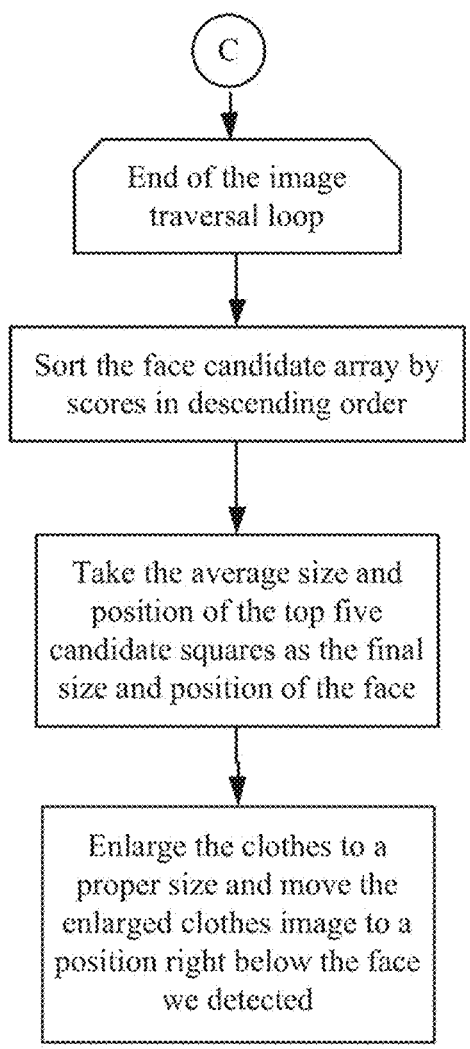

Referring to FIGS. 6 through 8, the details of the auto-fit and face recognition process of an example embodiment are illustrated. In an example embodiment, automatically fitting a virtual item of apparel (auto-fit) to a webcam image of a user/shopper is provided. For auto-fit, we apply a feature boost and recognition classifier for human face recognition (also denoted facial detection) from the webcam image of the user/shopper. Once the face is detected and the face image is isolated, we may make an estimate for the person's position according to the position and size of the face and then paste the clothing picture to a proper position. For example, the user may wish to try on a virtual jacket (or any other item of virtual apparel or footwear). In this case, we stretch the coat's (e.g., the item of virtual apparel's) width to 4.0 times of the face's width and paste the image of the stretched coat right below the face to provide an appropriate model for auto-fitting the apparel.

The feature boost and recognition classifier in an example embodiment is a machine learning process for classification. Generally, the feature boost and recognition classifier can be divided into two stages: feature boosting and recognition. For the first stage, we try to extract the top 200 weak classifiers out of an available set of classifiers that could be used to tell the difference between face images and non-face images. Each classifier, considered as a feature, is given a specific weight. Then, on the second stage, we test each region of the image with these 200 features. If a region earns a score that is more than 50% of the total weight of these 200 features, we consider this region as a face. Further details are provided below.

In order to boost some features with good performance in telling the difference between a face image and a non-face image, a set of training data can be used. Using the training data, the output provided can be used to identify the top 200 features with their own attributes (e.g., template type, startX, startY, width, height, threshold, etc). The output serves as the face recognition classifiers. Note that the feature boost and recognition classifier program has to be executed only once. Each template generates a variety of feature candidates with different size, aspect ratio and position. The feature value of the feature to an image is the total value of pixels in dark region minus the total value of pixels in a bright region. Each feature candidate should have its own criteria to judge whether a region of an image is in-class or out-of class. The criteria can include: (1) a threshold, and (2) a direction (less than or greater than).

In the boosting stage, we aim at boosting the top 200 features. It will be apparent to those of ordinary skill in the art that a different number of features can be used. The top 200 features are tested in various rounds of competition. In each round, the feature with best performance (least misclassification rate) is selected as one of the final features. The details of this process are described below:

A. Initial the weight of each image w(0,i)=1/m (face image, n:total number of face image). w(0,i)=1/n (non-face image, m:total number of non-face image)

B. For r=1, 2, . . . 200

B1: normalize the weight of each image in training set $$W(r, i) = w(r-1, i) / \left( \sum_{1}^{m+n} w(r-1, i) \right) \text{ (r:round, i:index of image)}$$

B2 to each feature candidate, we compute its misclassification rate $$e = \sum_{1}^{m+n} w(t, i) |h(xi, f, p, \theta) - yi|$$

h(xi,f,p,θ): is this image a face image according to the criteria (threshold&direction)?—0 or 1

Yi: is this image truly a face image?—0 or 1

B3 find the feature with least misclassification rate $$e(r) = \min(e(1, r, e(2,r), \ldots, e(N,r))$$

B4 adjust the weight of each image $$W(r, i) = w(r, i) \left( \frac{e(r)}{1-e(r)} \right)^{1-a(i)}$$

a(i)=0: picture I is classified correctly. a(i)=1: picture I is misclassified.

B5 give the feature that boosted a proper weight $$\text{Weight} = \log \frac{1-e(r)}{e(r)}$$

Having completed the boosting stage as described above, the recognition stage is performed next. In the recognition stage, we test all the n*n rectangular regions to see whether it is a face region. We test the region with the selected 200 classifiers whose total weight is normalized to 1. If the region earns a score more than 0.5, than it is a face region. In implementation, we may encounter some case where the actual face region and its neighbors are both classified as the face region. We solve this problem by computing the average position and size of all those rectangles as the final face region.

Figure 5:
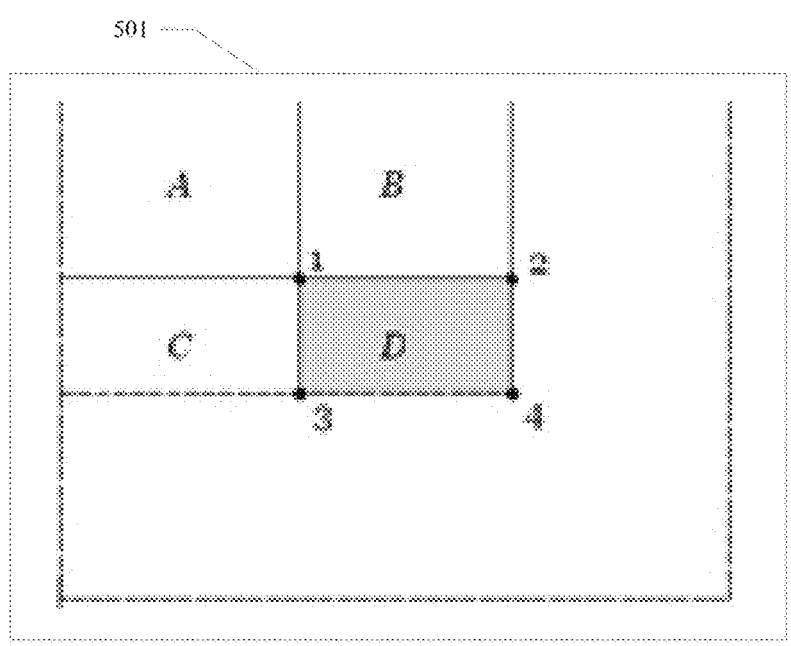
FIG. 5 illustrates an example of computing the total value of pixels in a particular region in an example embodiment.

In computing the total value of pixels in a particular region, we don't necessarily have to traverse the region. Referring to FIG. 5, for example, the value of pixels in region D can be computed as follows:

$$S(D)=S(A\&B\&C\&D)-S(A\&B)-S(A\&C)+S(A).$$

Thus, regardless of the size of the region, the total value of pixels in the region can be easily computed by three additions or subtractions, once the integral value of each pixel is computed, which can be done while loading the image. This optimization is used in face recognition, skin detection, and tracking. In the recognition step, instead of searching the face region pixel by pixel, we search the face region with the step of 8 pixels. Thus, the speedup is 8*8 times. As described above, FIGS. 6 through 8 provide the details of this process.

Figure 9:
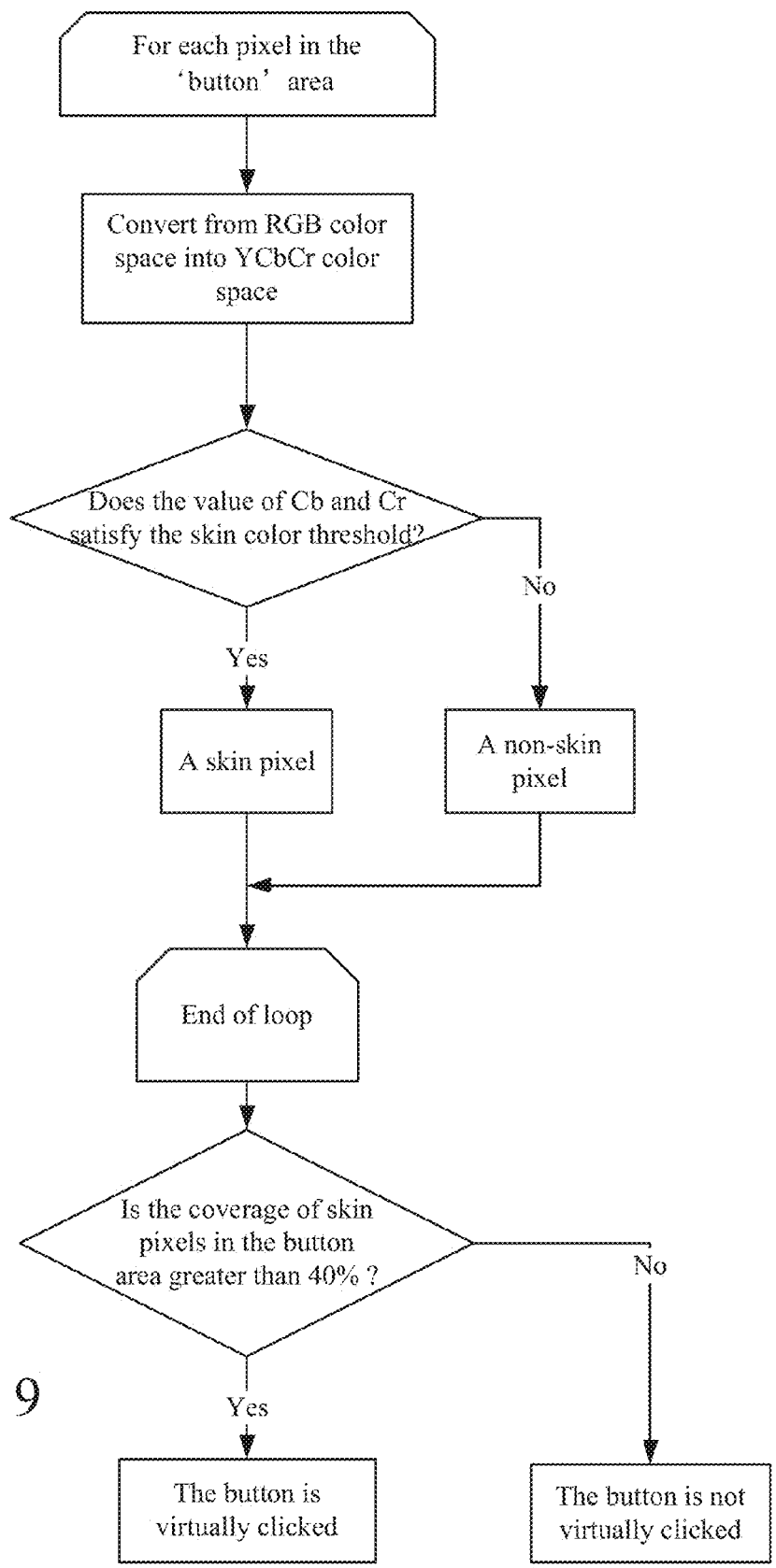
FIG. 9 illustrates the details of the skin detection and skin color tracking process of an example embodiment.

Referring to FIG. 9, the details of the skin detection and skin color tracking process are illustrated. We detect skin based on color information. Instead of RGB color, we convert each pixel into YCbCr color space, which is tolerant for light variance and saturation. This feature enables our skin color model work well in various environments and people of various races.

Transformation from RGB to YCbCr:

For each pixel: $Y=0.299*R+0.587*G+0.114*B+16$ $Cb=-0.1687*R-0.331*G+0.5*B+128$ $Cr=0.5*R-0.4187*G-0.081312*B+128;$ A pixel that satisfies 133<=Cr<=173 & 77<=Cb<=127 is considered as a pixel of skin color.

An example embodiment also includes a virtual button click capability. If the skin-color pixel coverage is more than 60% of the button region, we assume the button is triggered. (In a typical case, a button region is a rectangle.) FIG. 9 provides the details of this process.

Figure 10:
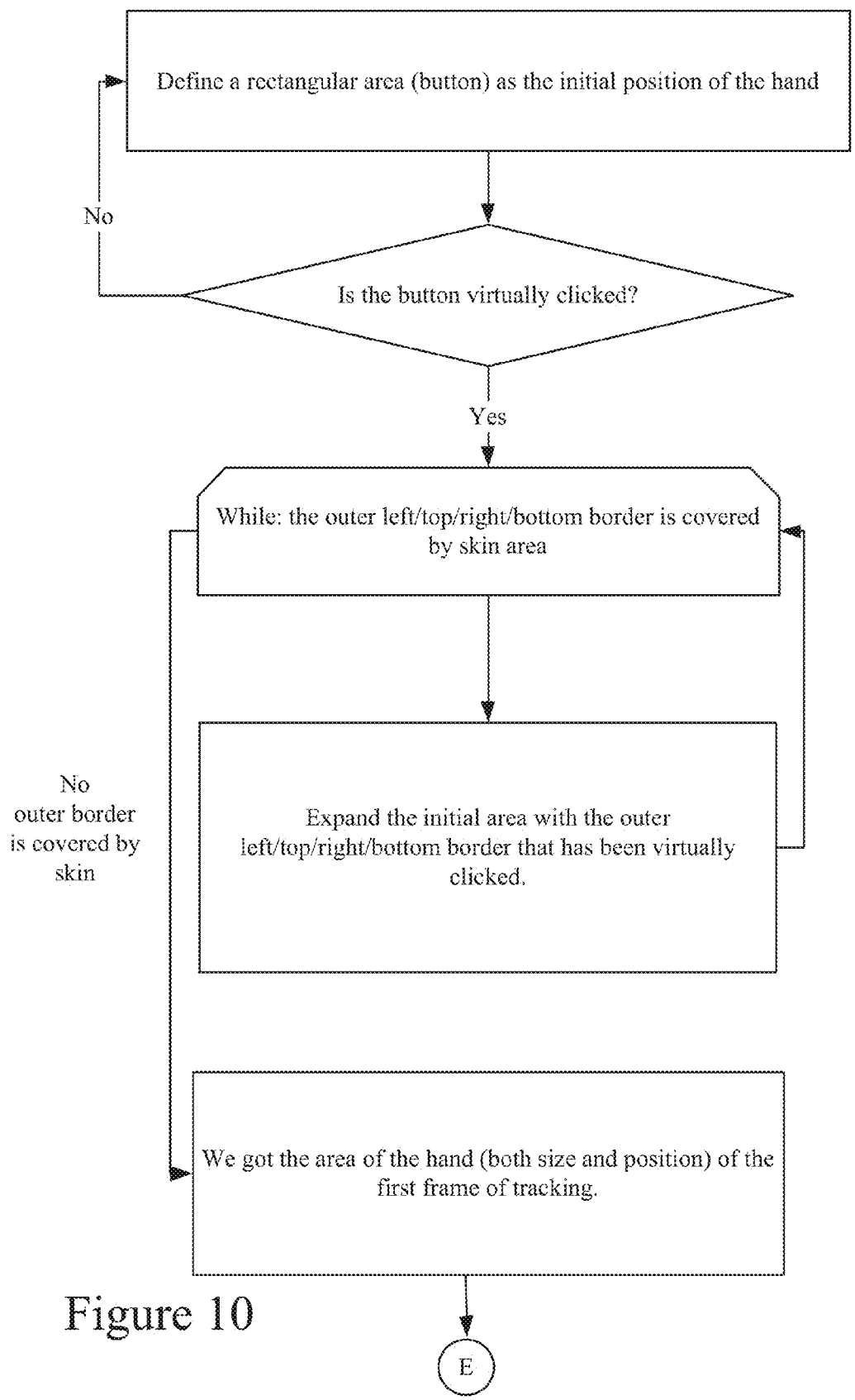
FIGS. 10 through 11 illustrate the details of the skin tracking process of an example embodiment.
Figure 11:
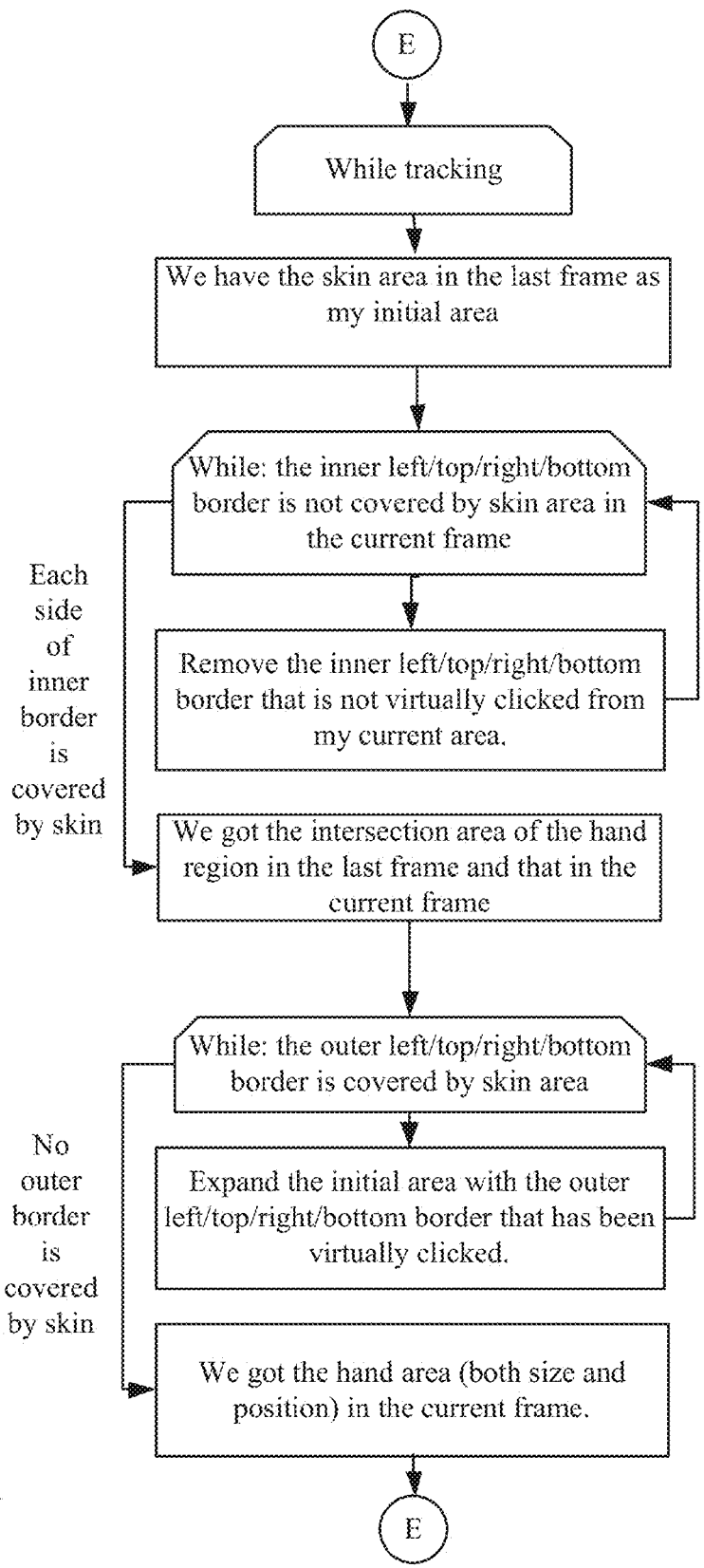

Referring to FIGS. 10 through 11, the details of the skin tracking process are illustrated. In our application, one of the most important tasks is real-time tracking of where the user's hands are located. We consider the region of one hand as a rectangle for abstraction. Suppose the hand region in the (N+1)th frame would not move so far from it in Nth frame. Our basic idea is to compute the interest region of the hand in both the Nth and the (N+1)th frames first, and then expand the intersection region to the one in the (N+1) frame.

Reduce the intersection region: The candidates to be reduced are 5-pixel-wide stripes in each side of the boundary of the region in the Nth frame. If the skin color does not cover 60% of the stripe region in the N+1th frame, the striped region is to be reduced and then new boundary is generated. This process is looped until there are no longer any stripes to be reduced.

Expand to region in N+1th frame: This process is the opposite of the process of used for reducing as described above. FIGS. 10 through 11 provide the details of this process.

Figure 12:
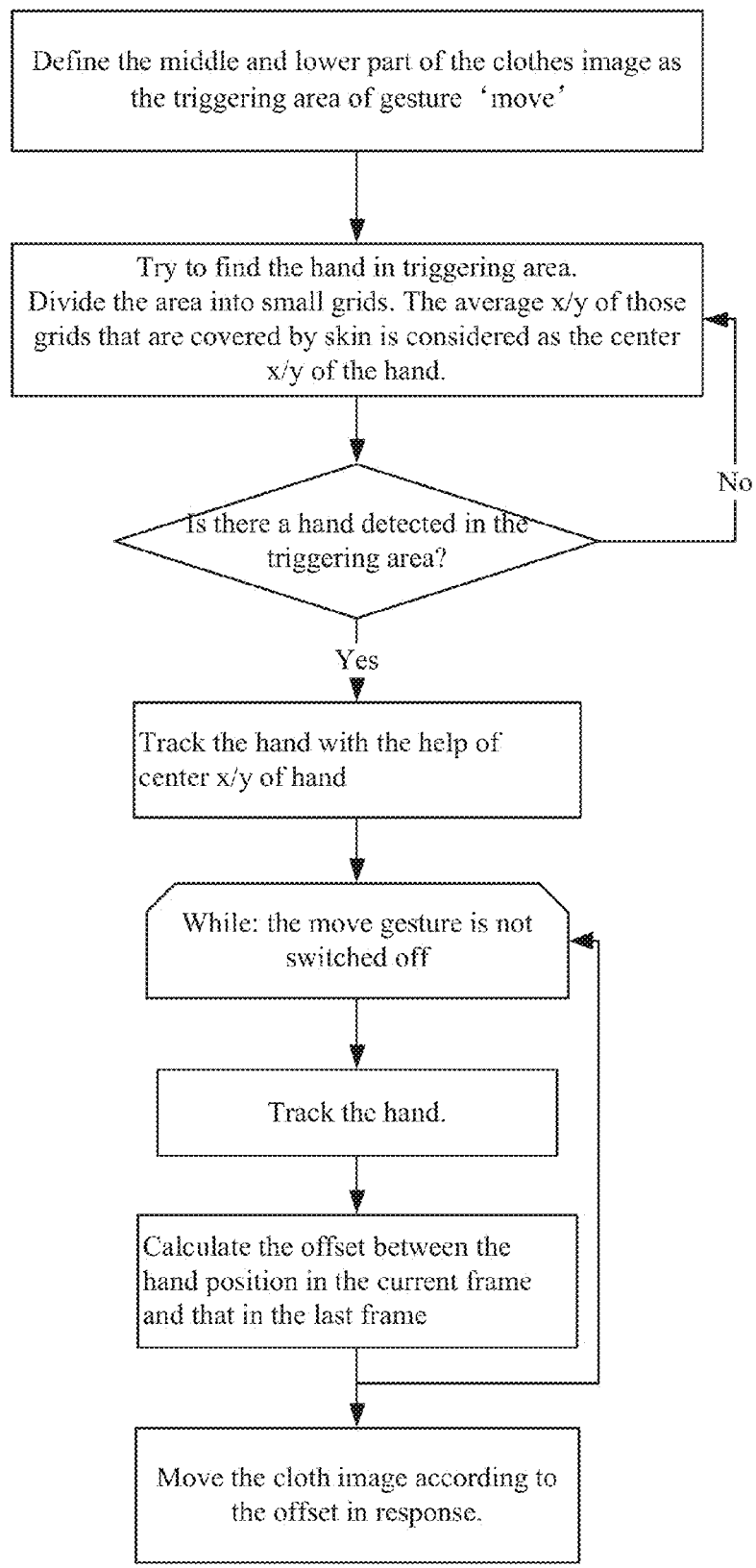
FIG. 12 illustrates the details of the gesture move process of an example embodiment.

Referring to FIG. 12, the details of the gesture move process are illustrated. We have developed a simple process to track the position and size of the hand based on its position in the previous frame. The only problem is how to find where the hand is in the 1st frame—calibration. We apply the following method: If the skin region covers a particular button, we consider the region corresponding to the button as the intersection of hand region in $0^{th}$ and $1^{st}$ frame.

In a particular embodiment, the user can control the clothes picture (apparel image) with their gestures. In one embodiment, there are three gestures in our application: move, stretch horizontally and stretch diagonally. We apply a simplified key frame-based process for our gesture recognition. In our approach, we just test (1) whether the user's hands move to a specified position, if yes, a particular gesture is triggered; or (2) whether the user keeps his/her hands position by some rules, if yes, this gesture is in process.

Though this approach seems simple enough, it has a big advantage: it endures the variety of durations of a gesture. For example, a user could perform a gesture in one second, two seconds, ten seconds, as long as s/he wants.

Move Function: When the v_hold switch is turned on, the user can virtually grab an item of virtual clothing and move the item to anywhere s/he wants (with his/her left hand) and turn off the v_hold switch.

Implementation: To trigger the move function, a triggering region is hidden in the lower part of the picture and is sliced into a number of smaller squares (virtual buttons). Once one of the small squares is triggered (by skin color coverage as described above), we then expand it to the hand region, which serves as the hand region for calibration (as described above), and start tracking the hand. The movement of the picture is in response to the movement of the hand that is tracked. FIG. 12 provides the details of this process.

Figure 13:
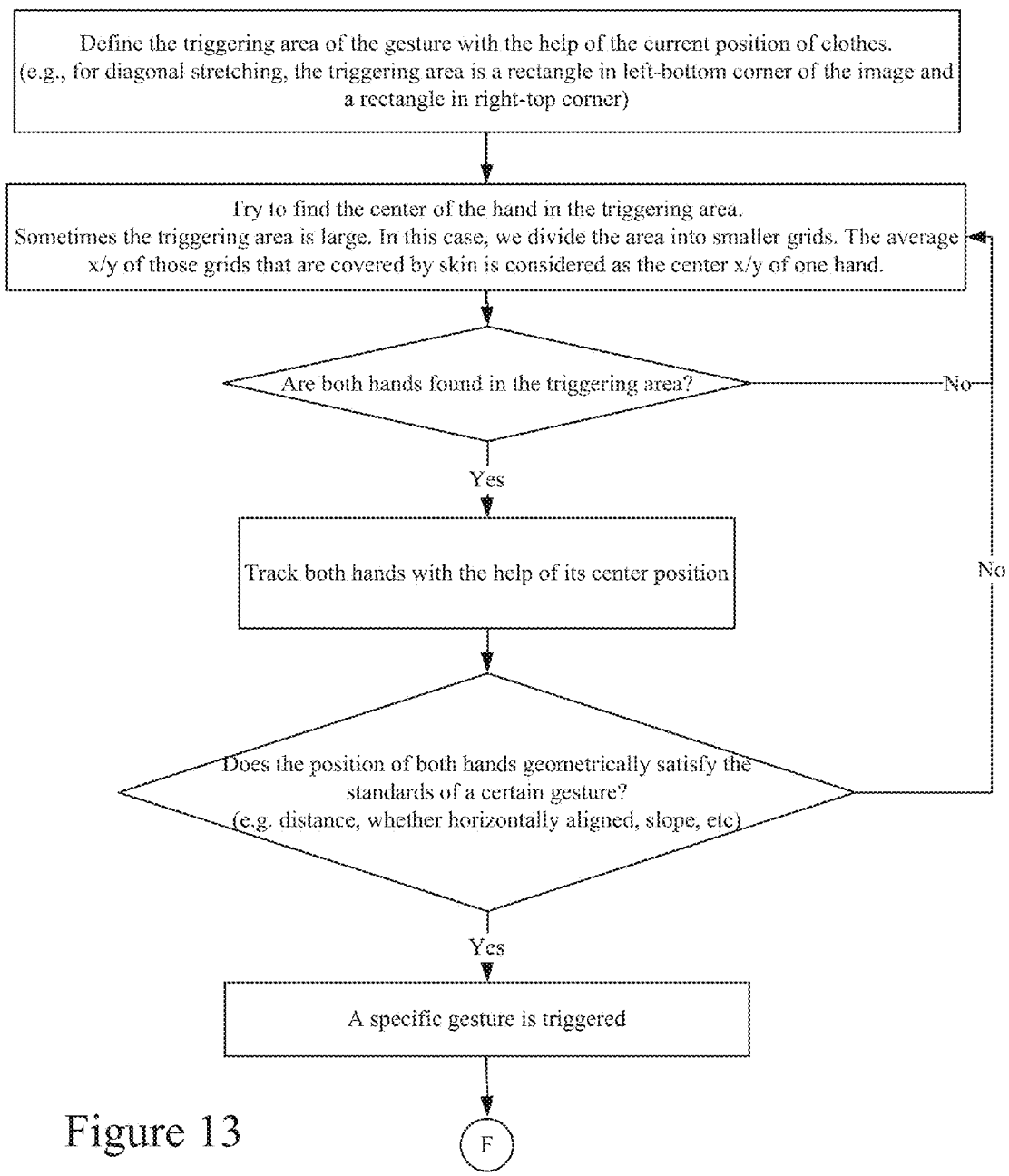
FIGS. 13 through 14 illustrate the details of the gesture stretch process of an example embodiment.
Figure 14:
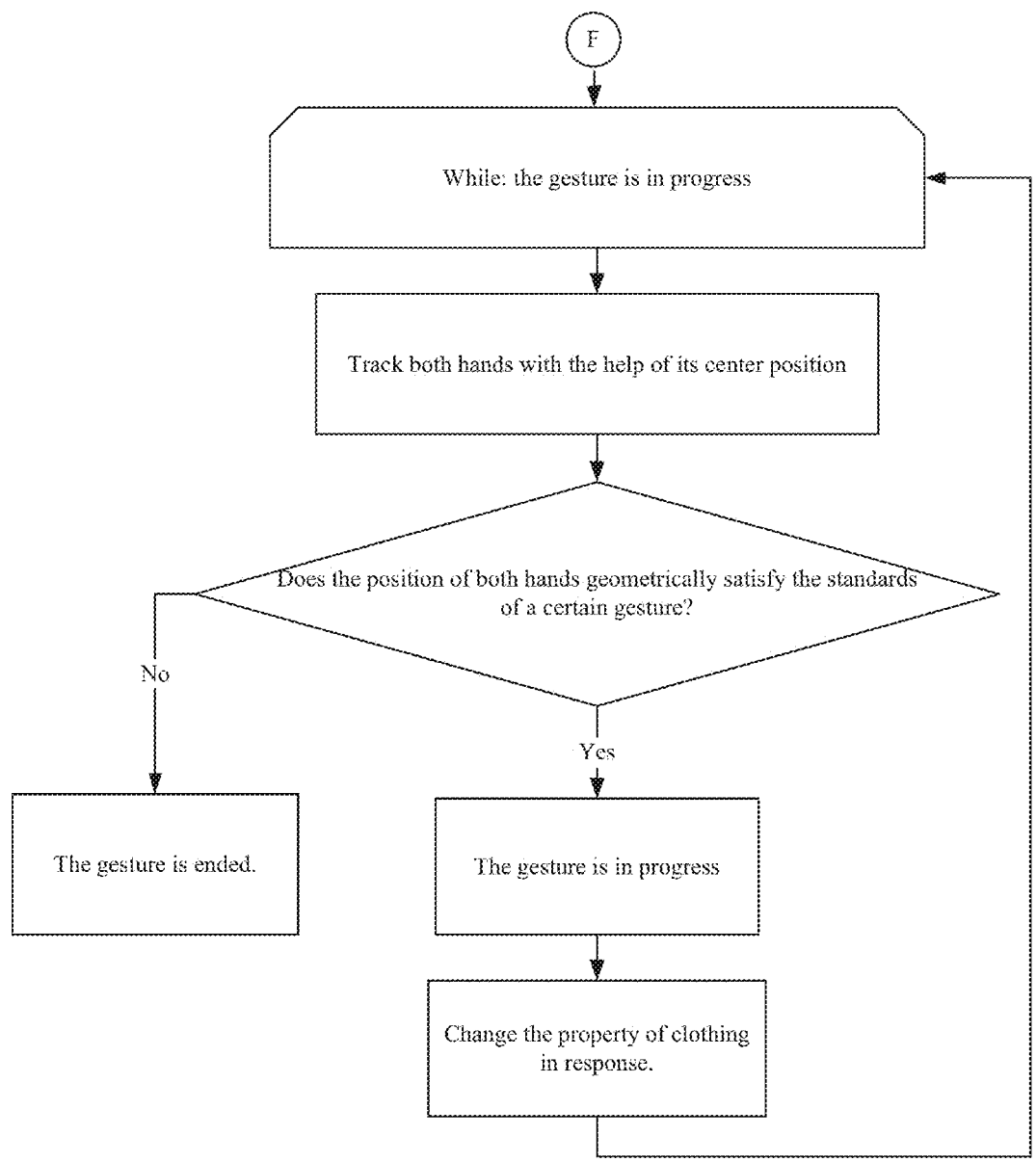

Referring to FIGS. 13 through 14, the details of the gesture stretch process are illustrated.

Stretch Horizontally Function: If user moves his/her hands to the left/right side of the picture and keeps his/her hands horizontally aligned, the horizontal stretch is triggered. S/he can control the width of the picture of the virtual clothes according to the distance between his/her two hands while s/he moves hands along the horizontal line. This function is designed for those who are a little too slim/overweight for the item of clothing they are trying on.

Implementation: To trigger the stretch function, a first triggering region is hidden in the left-mid part of the picture and a second triggering region is hidden in the right-mid part of the picture and both triggering regions are sliced into a number of smaller squares (virtual buttons). Once both triggering regions are triggered for calibration, we start to track the hands in each frame. If the hands are vertically aligned (|leftY−rightY|<40), the stretching gesture is triggered. As long as the difference between the leftY and the rightY is less than 40+10 (the extra 10 is for smoothness, thus the postures in the series of frames would not be classified as stretch gesture, non-stretch gesture, stretch-gesture, non-stretch gesture . . . ), the hands are vertically aligned. The stretching is enabled when the difference between the leftY and the rightY is greater than 40+10.

Stretch Diagonally Function: If user moves his/her hands to the top-right corner and bottom-left corner of the picture, the diagonal stretch is triggered. S/he can control the size of the picture according to the distance between his/her two hands while s/he moves hands along the diagonal line.

Implementation: The implementation of the Stretch Diagonally Function is similar to the implementation of the Horizontal Stretch Function described above. Two big virtual buttons are hidden in the top-right corner and left-bottom corner of the picture. Once both buttons are triggered in the one frame, we start to track both hands. To trigger the gesture, the slope of the line between the two hands ((lefty−rightY)/(rightX−leftX)) needs to be between 0.75~1.25 times of the aspect ratio of picture. To keep the gesture, the slope of the line of the two hands ((lefty−rightY)/(rightX−leftX)) needs to be between 0.7~1.3 times of the aspect ratio of picture. FIGS. 13 through 14 provide the details of this process and the other stretch gesture processes.

Figure 15:
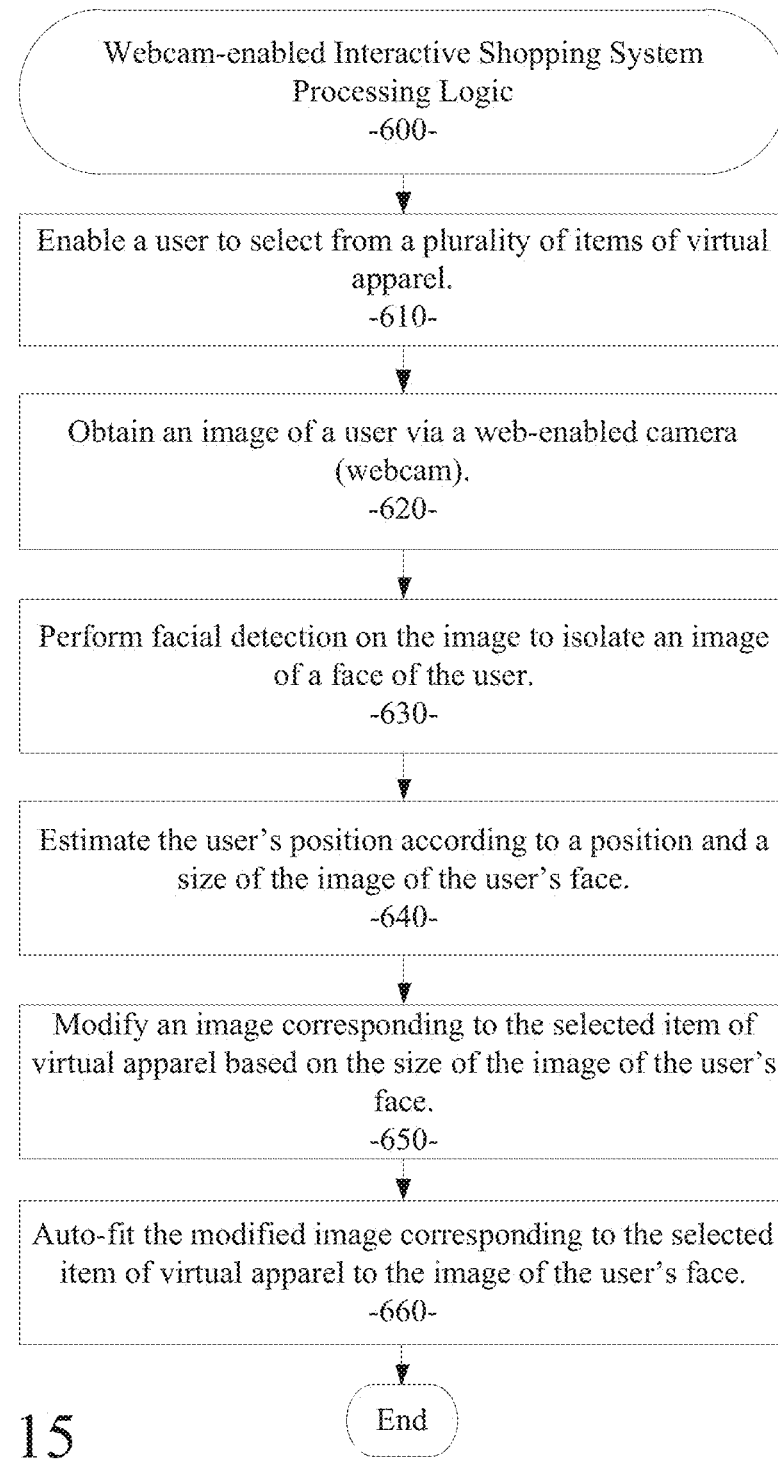
FIG. 15 is a processing flow chart illustrating an example embodiment of a webcam-enabled interactive shopping system as described herein.

FIG. 15 is a processing flow chart illustrating an example embodiment 600 of a Webcam-enabled Interactive Shopping System as described herein. The method of an example embodiment includes: enabling a user to select from a plurality of items of virtual apparel (processing block 610); obtaining an image of a user via a web-enabled camera (webcam) (processing block 620); using a data processor to perform facial detection on the image to isolate an image of a face of the user (processing block 630); estimating the user's position according to a position and a size of the image of the user's face (processing block 640); modifying an image corresponding to the selected item of virtual apparel based on the size of the image of the user's face (processing block 650); and auto-fitting the modified image corresponding to the selected item of virtual apparel to the image of the user's face (processing block 660).

Figure 16:
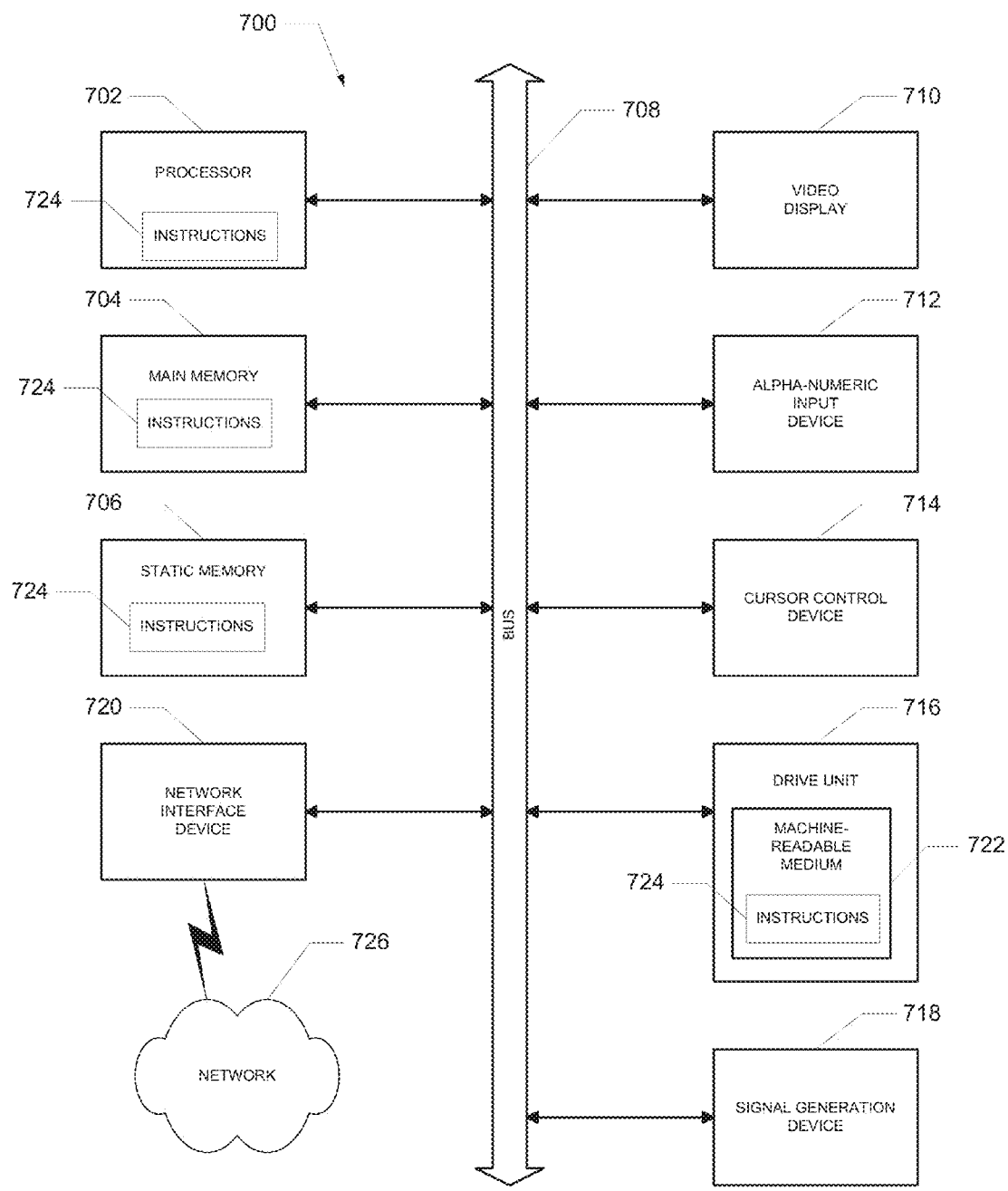
FIG. 16 shows a diagrammatic representation of machine in the example form of a computer system within which a set of instructions when executed may cause the machine to perform any one or more of the methodologies disclosed herein.

FIG. 16 shows a diagrammatic representation of machine in the example form of a computer system 700 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the data processor 702 during execution thereof by the computer system 700. The main memory 704 and the data processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" can also be taken to include any medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:

1. A method comprising:
   displaying a plurality of items of virtual apparel for a user to select from, each of the items of virtual apparel comprising a pre-stored image of the respective item;
   receiving a selection of one of the items of virtual apparel;
   obtaining a first image of a user via a web-enabled camera (webcam);
   performing, using a processor, facial detection, the performing comprising:
      identifying an available set of classifiers, each classifier in the available set of classifiers including a feature that provides differentiation between a face image and a non-face image;
      extracting a subset of classifiers from the available set of classifiers and assigning a specific weight to each classifier of the subset;
      identifying a second image from the first image, the second image being a region of the first image and identified based on a score associated with the region of the first image transgressing a threshold score relative to a total weight of the subset of classifiers;
      determining, based on the transgressing of the threshold score, that the second image includes a face; and
      isolating the second image from the first image;
   estimating, based on the isolating of the second image, a position of a body of the user relative to a position and a size of the second image, the body of the user and the estimated position of the body of the user being separate from and below the second image;
   modifying a pre-stored image corresponding to the selected item of virtual apparel, the modifying being relative to a portion of the body of the user that is separate from and below the second image and based on the size of the second image; and
   auto-fitting the modified image corresponding to the selected item of virtual apparel to the estimated position of the body of the user to appear separate from and below the second image.

2. The method as claimed in claim 1 wherein the facial detection includes searching the first image of the user in a plurality of pixel regions.

3. The method as claimed in claim 1, further comprising: performing skin detection and skin color tracking.

4. The method as claimed in claim 1, further comprising: converting RGB pixels to YCbCr color space.

5. The method as claimed in claim 1, further comprising: providing a virtual button click for the user to modify the auto-fitted image corresponding to the selected item of virtual apparel.

6. The method as claimed in claim 1, further comprising: providing gesture recognition, the gesture recognition including a gesture move function.

7. The method as claimed in claim 1, further comprising: providing gesture recognition, the gesture recognition including a gesture stretch horizontally function.

8. The method as claimed in claim 1, further comprising: providing gesture recognition, the gesture recognition including a gesture stretch diagonally function.

9. A system comprising:
   one or more processors and executable instructions accessible on a computer-readable medium that, when executed, cause the one or more processors to perform operations comprising:
      displaying a plurality of items of virtual apparel for a user to select from, each of the items of virtual apparel comprising a pre-stored image of the respective item;
      receiving a selection of one of the items of virtual apparel;
      obtaining a first image of a user via a web-enabled camera (webcam);
      performing facial detection, the performing comprising:
         identifying an available set of classifiers, each classifier in the available set of classifiers including a feature that provides differentiation between a face image and a non-face image;
extracting a subset of classifiers from the available set of classifiers and assigning a specific weight to each classifier of the subset;
identifying a second image from the first image, the second image being a region of the first image and identified based on a score associated with the region of the first image transgressing a threshold score relative to a total weight of the subset of classifiers;
determining, based on the transgressing of the threshold score, that the second image includes a face; and
isolating the second image from the first image;
estimating, based on the isolating of the second image, a position of a body of the user relative to a position and a size of the second image, the body of the user and the estimated position of the body of the user being separate from and below the second image;
modifying a pre-stored image corresponding to the selected item of virtual apparel, the modifying being relative to a portion of the body of the user that is separate from and below the second image and based on the size of the second image; and
auto-fitting the modified image corresponding to the selected item of virtual apparel to the estimated position of the body of the user to appear separate from and below the second image.

10. The system as claimed in claim 9 wherein the performing the facial detection further comprises searching the first image of the user in a plurality of pixel regions.

11. The system as claimed in claim 9, wherein the operations further comprise performing skin detection and skin color tracking.

12. The system as claimed in claim 9, wherein the operations further comprise converting RGB pixels to YCbCr color space.

13. The system as claimed in claim 9, wherein the operations further comprise providing a virtual button click for the user to modify the auto-fitted image corresponding to the selected item of virtual apparel.

14. The system as claimed in claim 9, wherein the operations further comprise providing gesture recognition, the gesture recognition including a gesture stretch horizontally function.

15. The system as claimed in claim 9, wherein the operations further comprise providing gesture recognition, the gesture recognition including a gesture stretch diagonally function.

16. A hardware storage device having stored therein instructions which, when executed by one or more processors of a machine, cause the machine to perform operations comprising:
displaying a plurality of items of virtual apparel for a user to select from, each of the items of virtual apparel comprising a pre-stored image of the respective item;
receiving a selection of one of the items of virtual apparel;
obtaining a first image of a user via a web-enabled camera (webcam);
performing facial detection, the performing comprising:
identifying an available set of classifiers, each classifier in the available set of classifiers including a feature that provides differentiation between a face image and a non-face image;
extracting a subset of classifiers from the available set of classifiers and assigning a specific weight to each classifier of the subset;
identifying a second image from the first image, the second image being a region of the first image and identified based on a score associated with the region of the first image transgressing a threshold score relative to a total weight of the subset of classifiers;
determining, based on the transgressing of the threshold score, that the second image includes a face; and
isolating the second image from the first image;
estimating, based on the isolating of the second image, a position of a body of the user relative to a position and a size of the second image, the body of the user and the estimated position of the body of the user being separate from and below the second image;
modifying a pre-stored image corresponding to the selected item of virtual apparel, the modifying being relative to a portion of the body of the user that is separate from and below the second image and based on the size of the second image; and
auto-fitting the modified image corresponding to the selected item of virtual apparel to the estimated position of the body of the user to appear separate from and below the second image.

17. The system as claimed in claim 9 wherein the at least one processor is further configured to provide gesture recognition, the gesture recognition including a gesture grab and move function to grab and move the selected item of virtual apparel.

* * * * *